US012638164B2

(12) United States Patent
Schaenzer et al.

(10) Patent No.: US 12,638,164 B2
(45) Date of Patent: May 26, 2026

(54) ADJUSTABLE MOUNT FOR VEHICLE EXTERIOR LIGHT

(71) Applicant: FCA US LLC, Auburn Hills, MI (US)

(72) Inventors: Cole T Schaenzer, Auburn Hills, MI (US); Jereme A.K. Berube, Auburn Hills, MI (US); Jeffrey E Long, Auburn Hills, MI (US); Matt Hilburn, Auburn Hills, MI (US); Gregory Vandervoord, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/921,750

(22) Filed: Oct. 21, 2024

(65) Prior Publication Data

US 2026/0110423 A1 Apr. 23, 2026

(51) Int. Cl.

| | |
|---|---|
| *F21V 21/26* | (2006.01) |
| *B60Q 1/24* | (2006.01) |
| *B60Q 1/26* | (2006.01) |
| *F21S 41/657* | (2018.01) |
| *F21V 21/30* | (2006.01) |
| *F21V 23/00* | (2015.01) |

(52) U.S. Cl.
CPC .............. *F21V 21/26* (2013.01); *B60Q 1/247* (2022.05); *B60Q 1/2611* (2013.01); *B60Q 1/2615* (2013.01); *B60Q 1/2661* (2013.01); *F21S 41/657* (2018.01); *F21V 21/30* (2013.01); *F21V 23/002* (2013.01)

(58) Field of Classification Search
CPC ......... F21V 21/26; F21V 21/30; B60Q 1/247;
B60Q 1/2611; B60Q 1/2615; B60Q 1/2661; B60Q 1/268; B60Q 1/302; F16M 2011/024; F16M 2200/024; B60R 2011/0085; B60R 2011/0087
See application file for complete search history.

(56) References Cited

U.S. PATENT DOCUMENTS

| | | | | |
|---|---|---|---|---|
| 4,707,014 A | * | 11/1987 | Rich | B60Q 1/2611 |
| | | | | 296/180.1 |
| 5,713,633 A | | 2/1998 | Lu | |

(Continued)

OTHER PUBLICATIONS

Carr; JL 180° Light Mount; https://www.carr.com/product/jl-180-light-mount/ (6 pages).

(Continued)

*Primary Examiner* — William N Harris
(74) *Attorney, Agent, or Firm* — Jeremy J. Klobucar

(57) ABSTRACT

A light assembly for a vehicle includes a first housing having multiple voids that are circumferentially spaced apart about an axis of rotation of the first housing, a second housing coupled to the first housing, a light module coupled to the second housing, and a first retainer. The first retainer is mounted adjacent to the first housing and is movable relative to the first housing from a first position in which the first retainer is at least partly received in at least one of the multiple voids and a second position in which the first retainer is not received in any of the multiple voids. In the first position, the first retainer inhibits or prevents rotation of the first housing relative to the first retainer, and in the second position, the first retainer permits rotation of the first housing relative to the first retainer.

20 Claims, 4 Drawing Sheets

(56) References Cited

U.S. PATENT DOCUMENTS

| | | | | |
|---|---|---|---|---|
| 6,007,216 | A * | 12/1999 | Donnelly | F21L 2/00 |
| | | | | 362/186 |
| 6,428,197 | B1 | 8/2002 | Downing | |
| 7,775,695 | B1 * | 8/2010 | Rose | B60Q 1/068 |
| | | | | 362/543 |
| 7,954,783 | B2 * | 6/2011 | Vigil | B60Q 1/2611 |
| | | | | 248/552 |
| 9,315,144 | B2 * | 4/2016 | Li | B60Q 1/2615 |
| 11,702,016 | B2 | 7/2023 | Schaenzer et al. | |
| 12,092,152 | B1 | 9/2024 | Spooner | |
| 2014/0328070 | A1 * | 11/2014 | Oquendo, Jr. | F21V 21/116 |
| | | | | 362/427 |
| 2022/0314875 | A1 * | 10/2022 | Watson | B60Q 1/2692 |

OTHER PUBLICATIONS

Bam, 360° Swivel Mounts; https://badassmounts.com/collections/
swivel-mounts (4 pages).
Written Opinion & International Search Report for PCT/US2025/
050898 dated Feb. 5, 2026, (11 pages).

* cited by examiner

ADJUSTABLE MOUNT FOR VEHICLE EXTERIOR LIGHT

FIELD

The present disclosure relates to a mount for a vehicle exterior light that permits moving the light to multiple orientations.

BACKGROUND

Some vehicles have accessories, such as a light, that may be mounted to the vehicle. Such lights may be mounted on the roof of the vehicle, above the windshield, and project light forward, over the front of the vehicle and onto terrain in front of the vehicle. The hard mounted lights might be able to pivot about the brackets that connect them to the vehicle to shine light more upward or downward, but the entire body of the lights cannot be moved to, for example a side of the vehicle to shine light on the side or toward the rear of the vehicle.

SUMMARY

In at least some implementations, a light assembly for a vehicle includes a first housing having a first surface and multiple voids formed in the first surface, the multiple voids are circumferentially spaced apart about an axis of rotation of the first housing, a second housing coupled to the first housing, a light module coupled to the second housing, and a first retainer. The first retainer is mounted adjacent to the first housing and is movable relative to the first housing. The first retainer has a first position in which the first retainer is at least partly received in at least one of the multiple voids and a second position in which the first retainer is not received in any of the multiple voids. When the first retainer is in the first position, the first retainer inhibits or prevents rotation of the first housing relative to the first retainer, and when the first retainer is in the second position, the first retainer permits rotation of the first housing relative to the first retainer.

In at least some implementations, the multiple voids are circumferentially spaced apart and a different one or more of the voids are aligned with the retainer when the first housing is in a first position compared to a second position, and wherein the first housing is rotated relative to the retainer from the first position to the second position. In at least some implementations, the voids each have a central axis that is parallel to the axis of rotation, and wherein the retainer moves in a direction that is parallel to the axis of rotation. In at least some implementations, the voids are radially spaced from the central axis.

In at least some implementations, the voids each have a central axis that is parallel to the axis of rotation, and wherein the retainer moves in a direction that is parallel to the axis of rotation.

In at least some implementations, the first housing includes a connector opening adapted to receive a connector that secures the first housing to a vehicle, the connector opening is coaxial with the axis of rotation of the first housing, and wherein the first housing is arranged so that the first housing can rotate when the retainer is in the second position and without moving the connector from the first housing.

In at least some implementations, one of the first housing and the second housing includes an end piece and the other of the first housing and the second housing includes a cavity in which at least part of the end piece is received, and wherein the second housing is rotatable about a second axis relative to the first housing, and the second axis is not coaxial with the axis of rotation of the first housing.

In at least some implementations, a second retainer is movable relative to the first housing, and wherein the second retainer has a first position in which rotation of the second housing relative to the first housing is prevented and the second retainer has a second position in which rotation of the second housing relative to the first housing is permitted.

In at least some implementations, one or both of the first housing and the second housing has multiple second voids that are spaced apart about a second axis of rotation that is not parallel to the axis of rotation of the first housing. When the second retainer is in a first position at least part of the second retainer is received in a second void and rotation of the second housing relative to the first housing about the second axis of rotation is prevented, and when the second retainer is in a second position the second retainer is not received in one of the second voids and rotation of the second housing relative to the first housing about the second axis of rotation is permitted.

In at least some implementations, the second voids extend radially relative to the second axis, are circumferentially spaced apart and are axially aligned.

In at least some implementations, a biasing member that provides a force on the retainer to yieldably bias the retainer to the first position, and wherein the retainer is moved to the second position against the force of the biasing member.

In at least some implementations, the assembly includes a connector having a head that overlaps part of the first housing outside of the connector opening, and the connector has a shank that extends axially from the head and includes threads adapted to be received in a threaded opening of a base that is secured to or part of the vehicle.

In at least some implementations, the first housing includes a wire opening that is open to the connector opening, and wherein the connector includes an opening that extends through the connector so that a wire of the light module can extend through the wire opening and through the connector.

In at least some implementations, a housing for the light module is integral with the second housing.

In at least some implementations, a light assembly for a vehicle, includes a first housing, a second housing, a light module, a first retainer and a second retainer. The first housing has a first set of retention features that are circumferentially spaced apart about an axis of rotation of the first housing. The second housing is coupled to the first housing, at least one of the first housing and the second housing has a second set of retention features, the second set of retention features being circumferentially spaced apart about an axis of rotation of the second housing. The light module is integral with or coupled to the second housing. The first retainer is movable relative to the first housing between a first position in which the first retainer is associated with at least one retention feature of the first set of retention features and a second position in which the first retainer is spaced from retention features of the first set of retention features. The first retainer when in the first position inhibits or prevents rotation of the first housing about the axis of rotation of the first housing, and the first retainer when in the second position permits rotation of the first housing about the axis of rotation of the first housing. The second retainer is movable relative to the first housing between a first position in which the second retainer is associated with at least one retention feature of the second set of retention features and a second position in which the second retainer is spaced from retention features of the second set of retention features. The second retainer when in the first position inhibits or prevents rotation of the second housing relative to the first housing and about the axis of rotation of the second housing, and the second retainer when in the second position permits rotation of the second housing about the axis of rotation of the second housing and relative to the first housing.

In at least some implementations, the axis of rotation of the first housing is not parallel to the axis of rotation of the second housing.

In at least some implementations, the first set of retention features includes multiple voids that each have a central axis that is parallel to the axis of rotation of the first housing.

In at least some implementations, the second set of retention features includes multiple voids that each have a central axis that is radially oriented relative to the axis of rotation of the second housing.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
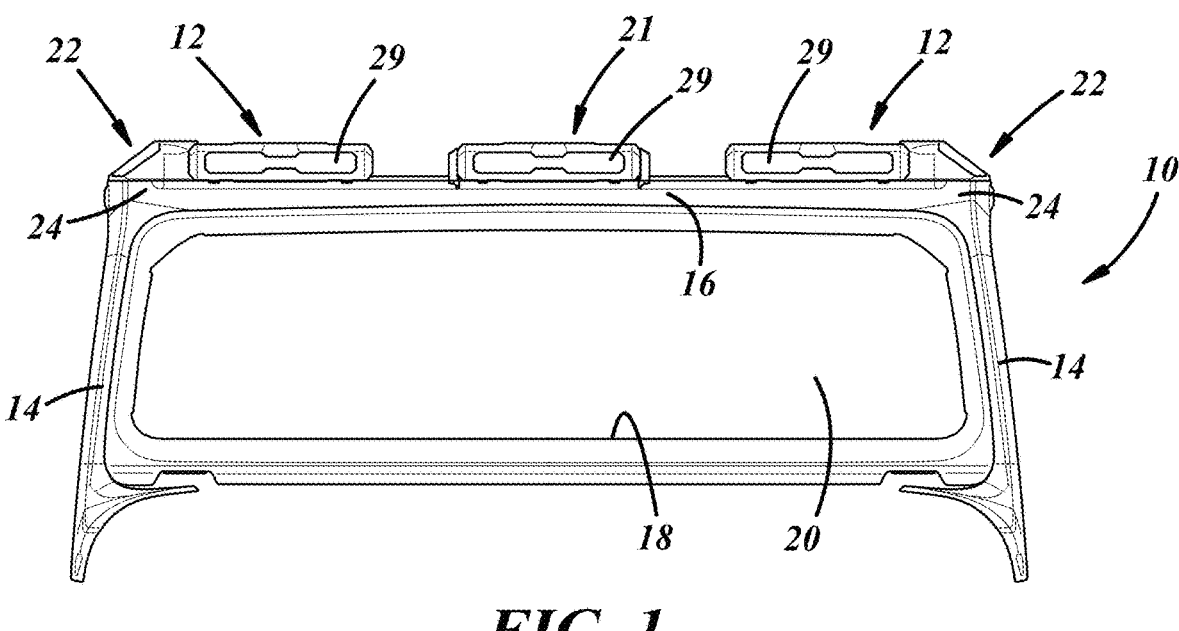
FIG. 1 is a front view of part of a vehicle frame that defines a windshield opening, and multiple light assemblies mounted to the vehicle.
Figure 2:
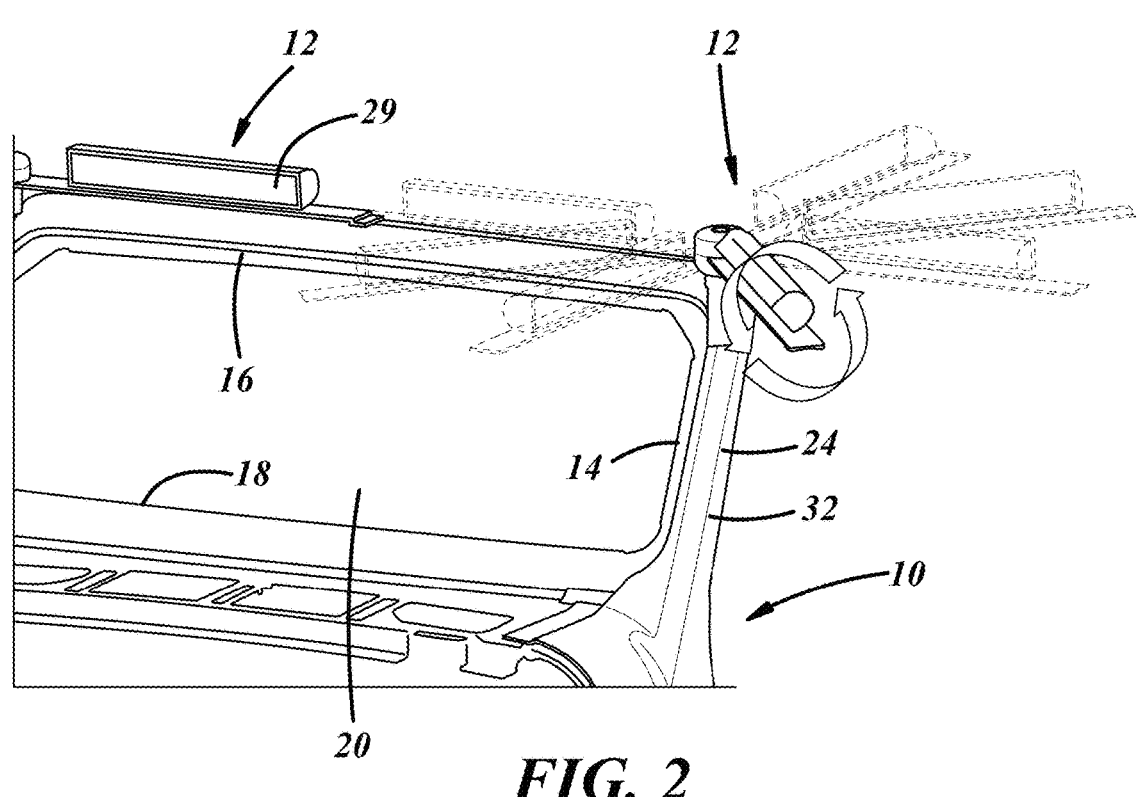
FIG. 2 is a perspective view of the vehicle showing one movable light assembly in other positions.

Referring in more detail to the drawings, FIGS. 1 and 2 illustrate part of a vehicle 10 with one or more light assemblies 12 mounted to the exterior of the vehicle 10. In the example shown, the light assemblies 12 are mounted to one or more of the upright supports which could be front pillars 14 of the vehicle 10 and a cross member 16 extending between the front pillars 14, where the cross member 16 and pillars 14 define at least part of an opening 18 for a windshield 20. In the example shown in FIG. 1, a central light assembly 21 is fixed in place and does not move (although it could, if desired) while outer light assemblies 12 are mounted for movement relative to the vehicle 10 as noted herein. The light assemblies 12 may be mounted to a different portion of the vehicle 10 spaced from the windshield 20, if desired. As shown in FIG. 2, one or more of the light assemblies 12 includes at least a portion that may be moved relative to the vehicle 10 to multiple positions, and as explained below, the movable light assemblies 12 may be releasably retained in multiple positions relative to the vehicle 10 by a mount 22.

Figures 3, 4:
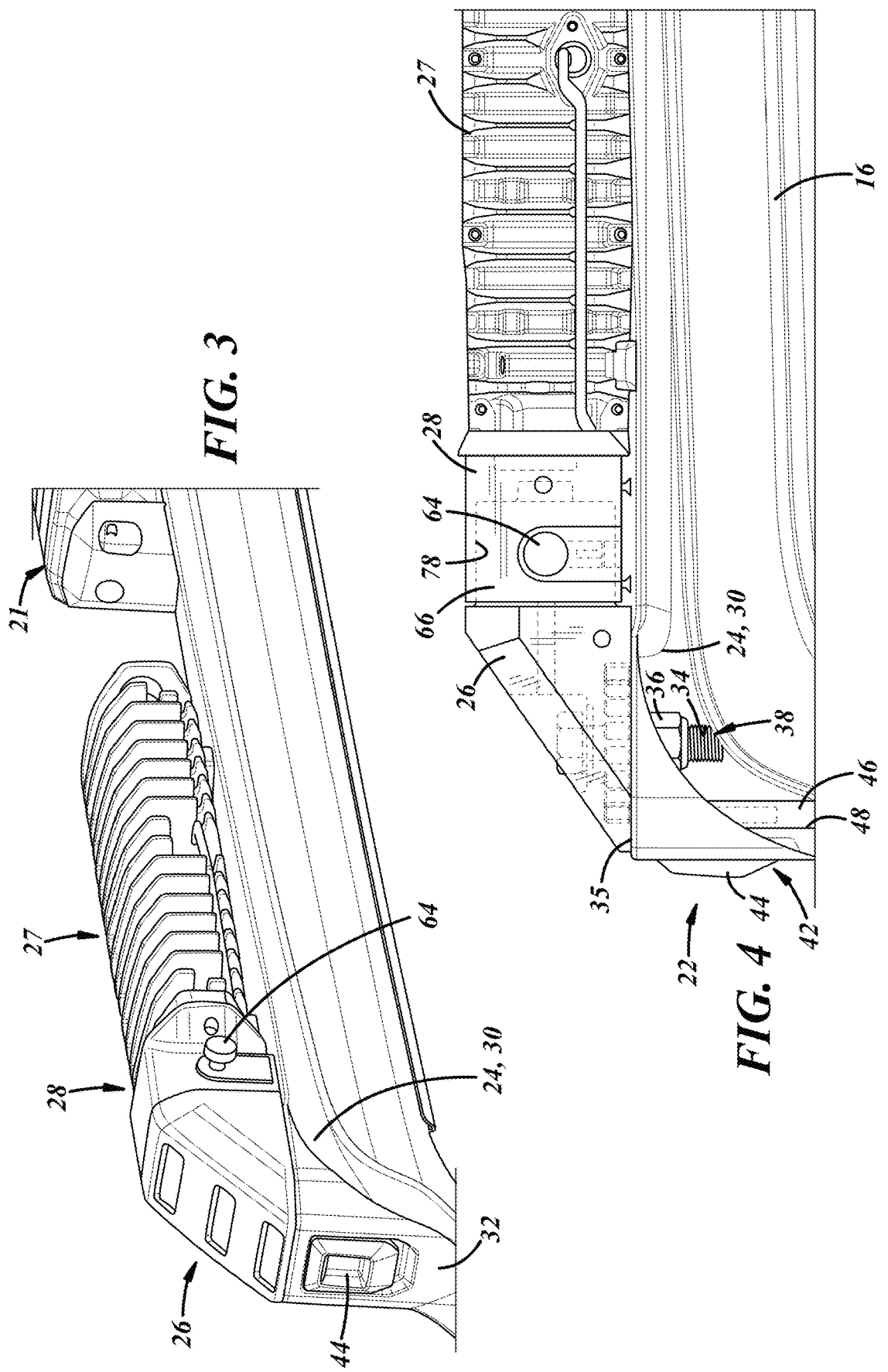
FIG. 3 is an enlarged perspective view of a movable light assembly in the first position, with a cover of a light module removed.
FIG. 4 is a rear view of part of the frame and movable light assembly, with the cover of a light module removed.

As shown in FIGS. 3 and 4, the mount 22 may include a base 24 adapted to be mounted to or defined by part of the vehicle 10, a first housing 26 connected to the base 24, and a second housing 28 coupled to the first housing 26. A light module 27 is coupled to the second housing 28 and includes one or more light sources 29 (labelled in FIGS. 1 and 2), such as one or more light bulbs or light emitters (e.g. LEDs or the like). In at least some implementations, the base 24 may be coupled to any desired vehicle structural member, such as one or both of the support pillars 14 and the cross member 16, to mount the light assemblies 12 above the windshield 20 as in the embodiment shown in the drawings. In this example, the base 24 may be connected to or adjacent to one pillar 14, and or the cross member 16. Other arrangements may be used, for example, to position the light assemblies 12 is a different position above, on a side of or below the windshield 20, or in a different location on the vehicle 10 spaced from the windshield 20 (e.g. on or adjacent to a side or the rear of the vehicle 10, or a front of the vehicle 10, e.g. near a front bumper). As used herein, the term or "structural member" is intended to refer to a portion of the vehicle frame, main support structure, body panel, bumper, fascia or other component to which the base 24 and/or light assemblies 12 could be mounted.

Figure 5:
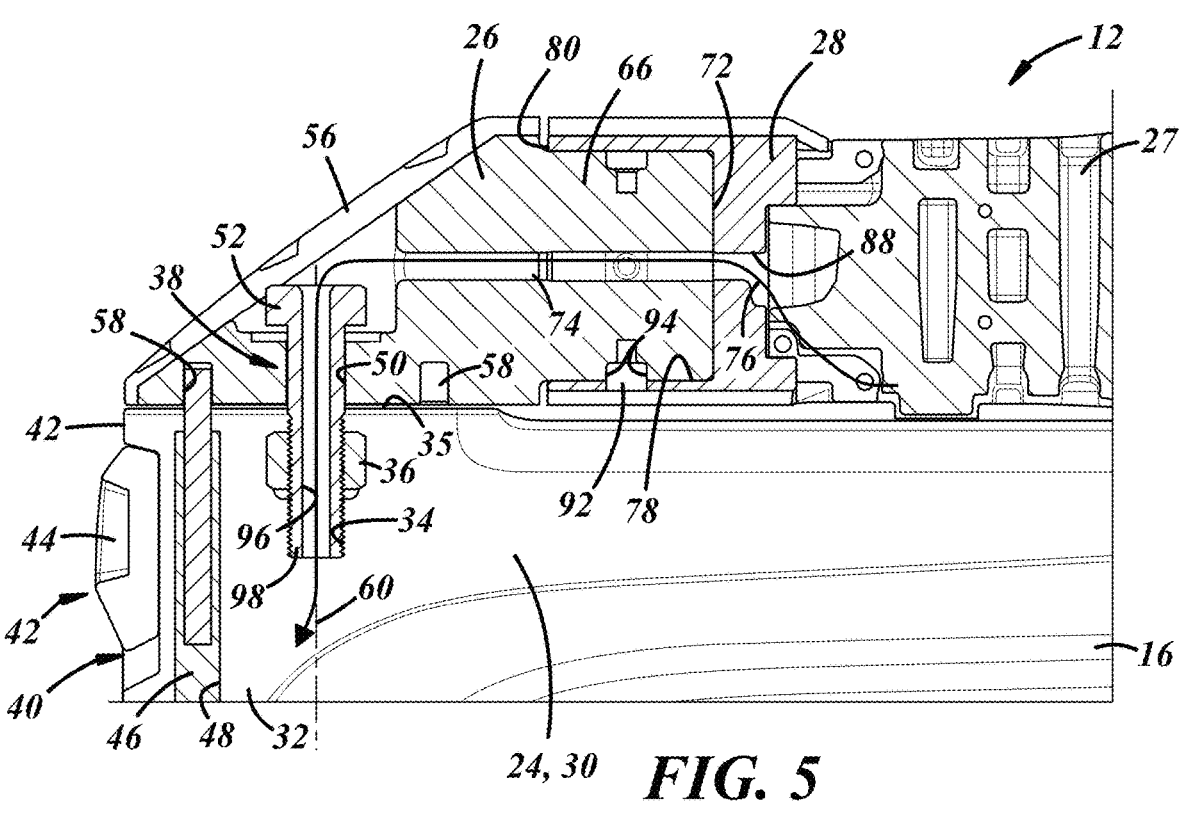
FIG. 5 is a sectional view showing part of the frame and movable light assembly.

As shown in FIGS. 3-5, the base 24 includes a main body 30 carried by or formed integrally with and defined by a structural member of the vehicle 10, such as a pillar 14 or cross member 16. The main body 30 in the implementation shown is separate from and connected to the vehicle structural member to retain the main body 30 in a fixed position relative to the vehicle 10. A portion of the base 24, which may include part of the main body 30 or a cover 32 fixed to the main body 30, may define part of an exterior of the vehicle 10 when installed, and an outer surface of the base 24 may be a show surface visible from the exterior of the vehicle 10.

As shown in FIGS. 4 and 5, to facilitate coupling the first housing 26 to the base 24, the base 24 includes a first opening 34 in the main body 30 that is open to a surface 35 on which the first housing 26 is received. The first opening 34 may include threads or a threaded member 36 adapted to receive a threaded portion of a connector 38 that secures the first housing 26 to the main body 30. The main body 30 or other part of the base 24 may include a second opening 40 that extends through an outer surface 42 of the main body 30 and is open to the exterior of the base 24 and vehicle 10.

As shown in FIGS. 3-5, a first retainer 42 is carried by the base 24 and has a portion that extends out of the second opening 40 and may be manually actuated to move the first retainer 42, as described in more detail below. The first retainer 42 has a first portion 44 received in the second opening 40 and accessible from outside the vehicle 10, and a second portion 46 that is received in the base 24 and is coupled to the first portion. The first retainer 42 is slidably or otherwise movably carried by the base 24 to move the second portion 46 of the first retainer 42 relative to the first housing 26, as set forth in more detail later. In the example shown, the second portion 46 of the first retainer 42 is received in a third opening 48 of the base 24, and extends out of the base 24 through the surface 35 in one position of the first retainer 42, as shown in FIG. 5. In at least some implementations, the third opening 48 is parallel to the first opening 34. The second portion 46 of the first retainer 42 can be of any desired size and shape, and is arranged to interact with one or more of a first set of voids that are provided in a portion of the first housing 26 that overlaps the third opening 48.

The first housing 26 overlaps the first opening 34 and the third opening 48 of the base 24, and is secured to the base 24 by the connector 38. In at least some implementations, the first housing 26 includes a connector opening 50 through which the connector 38 is received. In assembly, a head 52 of the connector 38 overlaps and traps part of the first housing 26 between the head 52 and the base 24, to maintain the first housing 26 coupled to the base 24. In the example shown, the head 52 of the connector 38 is received in a counterbore 54 and a cover 56 is received over the first housing 26 to hide the connector 38 and connector opening 50.

In the part of the first housing 26 that overlaps the third opening 48 of the base 24, the first housing 26 includes a first set of retention features 58 that are circumferentially spaced apart about and radially spaced from a central axis 60 of the connector opening 50 and the first opening 34 in the base 24, which hereafter is sometimes called a first axis 60. The retention features are shown as individual, spaced apart voids 58. The voids 58 may be cylindrical or of any desired shape suitable to receive part of the first retainer 42, and the voids 58 are open to the surface of the first housing 26 that overlaps the base 24. The voids 58 each extend in a direction parallel to the first axis 60, which is the direction of movement of the first retainer 42. As set forth in more detail below, the first housing 26 is rotatable about the first axis 60 and when rotated to different positions, different voids 58 are aligned with the third opening 48 of the base 24 and the second portion 46 of the first retainer 42 that is received in the third opening 48. The locations of the voids 58 (e.g. between the central axis of each void 58) defines the angular orientations or angular positions to which the first housing 26 may be retained relative to the base 24 by the first retainer 42. The voids 58 may, but need not be, evenly circumferentially spaced apart.

Figure 6:
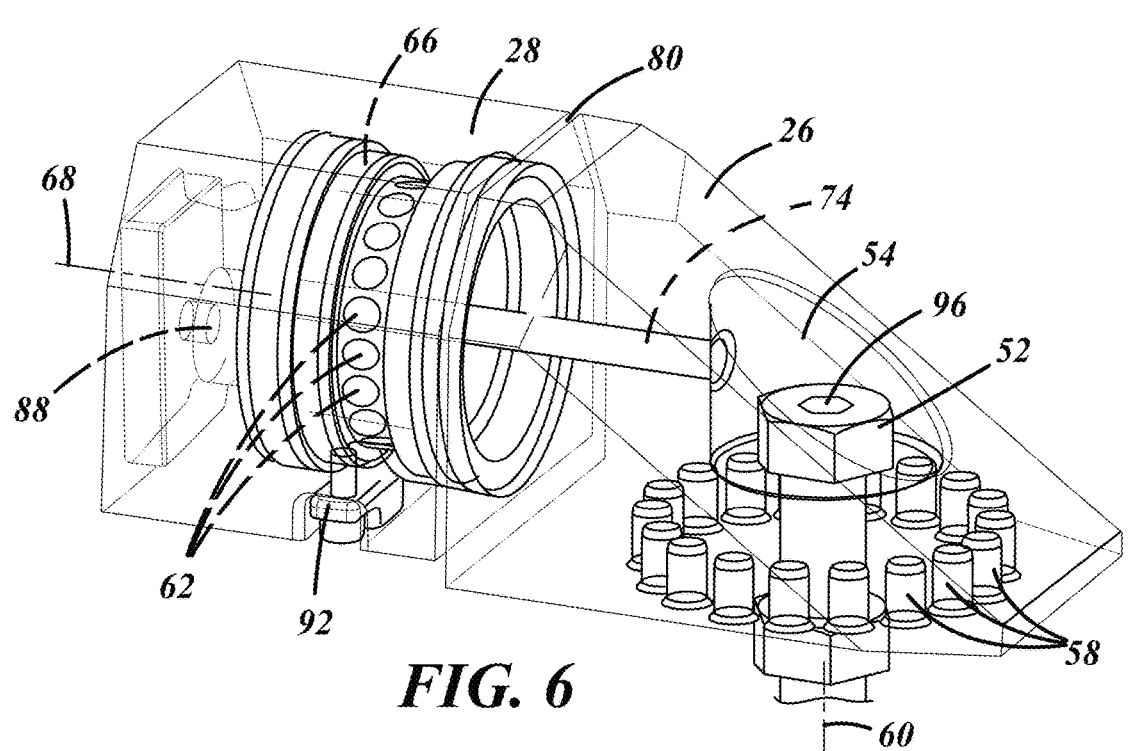
FIG. 6 is a perspective view of a base and part of a support of the movable light assembly, shown transparent to illustrate internal features and components of each.
Figure 7:
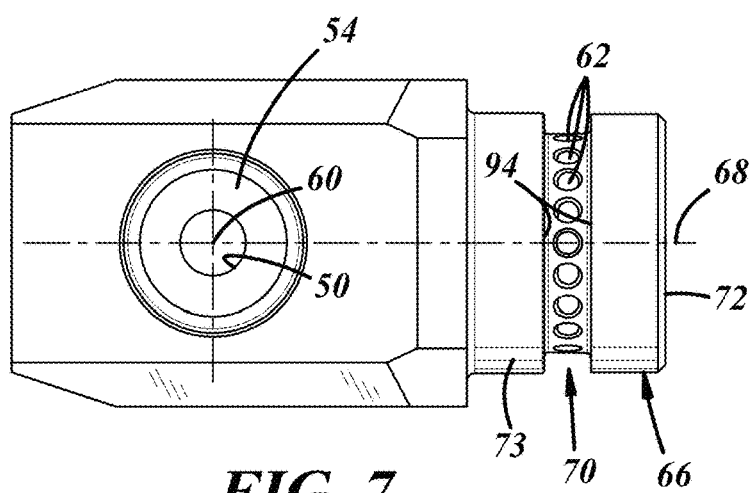
FIG. 7 is a top view of the base.
Figure 8:
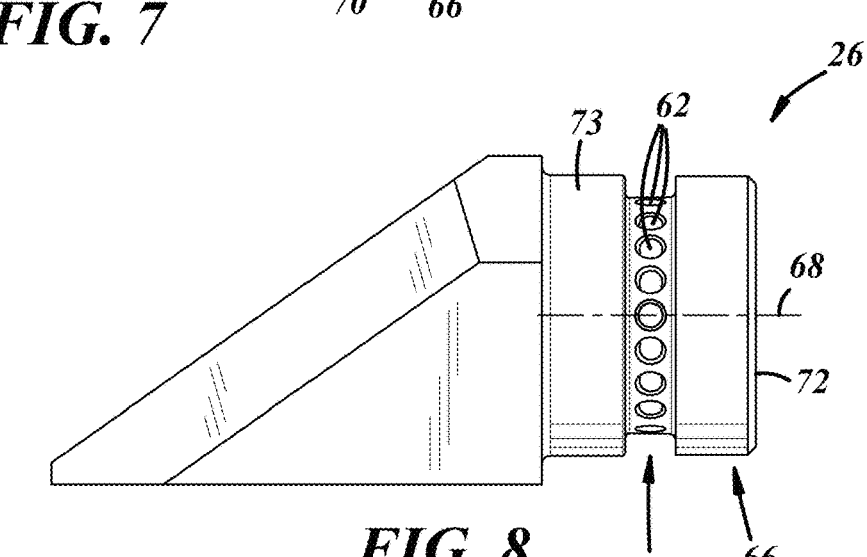
FIG. 8 is a side view of the base.

Referring to FIGS. 6-8, the first housing 26 may also include a second set of retention features 62 that are used with a second retainer 64 (FIGS. 3 and 4) to releasably retain the second housing 28 in one of multiple positions relative to the first housing 26. With the light module 27 coupled to the second housing 28, movement of the second housing 28 relative to the first housing 26 changes the angle of the light emitter(s) 29, and hence light output, relative to the base 24 and the first housing 26. In the embodiment shown, the retention features are shown as voids 62 formed in a cylindrical end piece 66 of the first housing 26. As best seen in FIGS. 7 and 8, the cylindrical end piece 66 has a central axis 68 and the voids 62, in at least some implementations, are at least partially separate from each other and are circumferentially spaced apart, axially aligned, and extend radially relative to the central axis 68 of the end piece 66 (sometimes called a second axis 68). In at least some implementations, the end piece 66 includes a groove 70 formed axially spaced from an end surface 72 adjacent to the second housing 28 and the voids 62 are formed in the groove 70, radially inwardly spaced from an outer surface 73 of the end piece 66.

In at least some implementations, as shown in FIG. 5, the first housing 26 includes a wire opening 74 through which may be routed a wire 76 that is used to provide electrical power to the light module 27 of the light assembly 12. In at least some implementations, the wire opening 74 opens at one end to the connector opening 50 and at its other end to the end surface 72 of the end piece 66, adjacent to the second housing 28.

Figure 9:
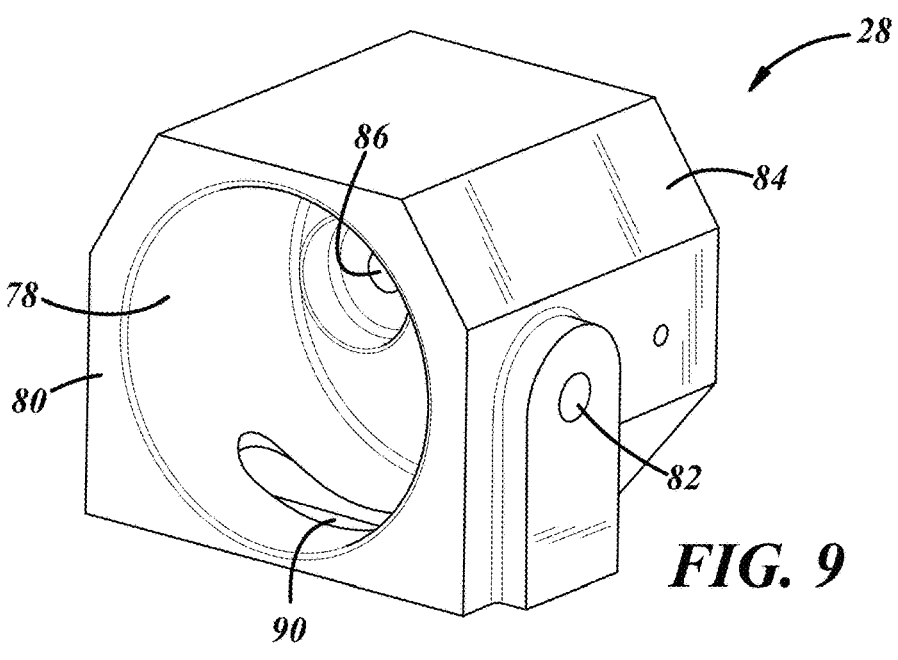
FIG. 9 is a perspective view of the support.

As shown in FIGS. 4-6 and 9, the second housing 28 includes a body with a tubular cavity 78 open to a first end 80 of the body, and the cavity 78 is sized to coaxially receive therein at least part of the end piece 66 of the first housing 26. As shown in FIG. 9, a retainer opening 82 extends through a sidewall 84 of the body and is open to the cavity 78. In assembly, the second retainer 64 is received in the retainer opening 82 and is movable from a first position in which the second retainer 64 extends into the cavity 78 for receipt in a void 62 of the second set and a second position in which the second retainer 64 is not received in a void 62. When the second retainer 64 is in the second position, the second housing 28 can be rotated about the second axis 68 relative to the first housing 26. This permits changing, by rotation about the second axis 68, the angle or orientation of the light module 27 that is coupled to the second housing 28. As shown in FIG. 9, one or more fastener openings 86 may be provided through a wall that defines a bottom of the cavity 78 to receive fasteners (e.g. screws) via which the light module 27 can be secured to the second housing 28. To permit a wire 76 to be routed internally through the second housing 28, the second housing 28 includes a second wire opening 88 (FIG. 5) that is aligned with the wire opening 74 (which may be called a first wire opening 74) in the first housing 26.

To prevent separation of the second housing 28 from the first housing 26 in a direction parallel to the second axis 68, an opening, which may be a slot 90 (FIG. 9) is formed through the sidewall 84 and open to the cavity 78 to receive a coupler 92 (shown in FIGS. 5 and 6). The coupler 92 may be a thin plate or rod, or other structure, that extends partly into the cavity 78, is received in the groove 70 of the first housing 26, and may be fixed to the body of the second housing 28 (e.g. by screws). The coupler 92 limits or prevents axial movement of the second housing 28 relative to the first housing 26, to retain the second housing 28 and the light module 27 coupled to the first housing 26. The coupler 92 is adapted to abut opposing stop surfaces 94 (FIG. 7) of the first housing 26, that are defined by opposite side surfaces of the groove 70, and that are arranged axially and extend radially (so rotation of the second housing 28 relative to the first housing 26 is permitted). Without a coupler 92, the first housing 26 and second housing 28 could be releasably coupled together by suitable fasteners, such as screws, received in the groove 70 or otherwise arranged to inhibit axial motion between the first and second housings 26, 28 but permit relative rotation. The coupler 92 may, in at least some implementations, provide a more robust connection that resists damage, such as may occur to threads or threaded bores, when the light assembly 12 is adjusted in use.

As shown in FIG. 5, when the first housing 26 is positioned so that one of the voids 58 of the first set of retention features is aligned with the third opening 48 of the base 24, at least part of the first retainer 42 (e.g. at least part of the second portion 46) may be received in the aligned void 58 to retain the position of the first housing 26 relative to the base 24 (e.g. to inhibit or prevent rotation of the first housing 26 relative to the base 24). To move the first housing 26 relative to the base 24 and the connector 38 about the first axis 60, the first retainer 42 is moved to its second position so that no part of the first retainer 42 is within the void 58, and the first housing 26 is rotated about the first axis 60. This occurs without having to move the connector 38 relative to the base 24, by installing the connector 38 so that the first housing 26 is not so firmly trapped against the base 24 that it cannot rotate relative to the connector 38 and base 24. In the new position, a different one of the voids 58 of the first set is aligned with the third opening 48, and the first housing 26 can be retained in the new position by moving the first retainer 42 to its first position wherein part of the first retainer is received in the void 58 that is now aligned with the third opening 48 and the first retainer 42. In the example shown, the movement of the first housing 26 about the first axis 60 allows the light assembly 12 to be moved in a plane perpendicular to the first axis 60, as shown in FIG. 2.

To adjust the rotational angle of the light module 27 relative to the second axis 68, the second retainer 64 can be moved from its first position to its second position in a generally radial direction that matches the radial orientation of the voids 62 of the second set. This withdraws part of the second retainer 64 from an aligned void 62 of the second set of retention features, and allows the second housing 28 and attached light module 27 to be rotated about the second axis 68 relative to the first housing 26 and the base 24. In at least some implementations, this can be done when the light assembly 12 is any rotational position relative to the first axis 60. When the second housing 28 and light module 27 are rotated to the new position, the second retainer 64 may be moved back to its first position wherein it is received in an aligned void 62 of the second set. This prevents further rotation of the second housing 28 and light module 27 and retains the position thereof.

Thus, the light module 27 may be adjusted by rotation about two different axes 60, 68, and may be rotated to and selectively retained in multiple positions relative to both axes, to permit a wide range of adjustment and versatility of the light assembly 12. The adjustments may be made manually, that is by hand and without the need of tools to remove fasteners of the like. Further, the adjustments can be made without removing the connector 38 from the base 24, and in at least some implementations without moving at all (e.g. without loosening) the connector 38. That is, the connector 38 may remain in a fully assembled position relative to the base 24 and the first housing 26 while the first housing 26 is rotated about the first axis 60. The retainers 42, 64 can be spring biased to automatically return under spring force to their first positions such that the retainers only need to be moved to their second position to permit adjustment and then can be released to retain the light assembly 12 in an adjusted, new position.

As shown in FIGS. 4-6 and described earlier, the first housing 26 may be coupled to the base 24 by a connector 38, which may be a threaded fastener, such as a bolt. The connector 38 may include a passage 96 extending through the head 52 and a shank 98 and open to the first wire passage 74 formed through the first housing 26. So arranged, wires 76 used to power one or more lights within the light module 27 may be routed through the wire openings 74, 88 in the first housing 26 and second housing 28 and through connector 38 to a power source (e.g. a fused electrical circuit of the vehicle 10). When a cover 32 is installed over at least part of the first housing 26, as shown in FIGS. 3 and 5, the wire 76 is hidden from exterior view and is entirely internal within the light assembly 12. The wire 76 may be routed through a vehicle structural component (e.g. a pillar 14) or the base 24 or a component connected to the base 24 (e.g. a cover 32 or shroud) and coupled to the vehicle 10, which may extend along the windshield 20 (or other portion of the vehicle 10) so that the wire is hidden from view.

While the first housing 26 is shown as having the tubular end piece 66 over which part of the second housing 28 is received, other arrangements may be used, as desired. For example, the second housing 28 could include the tubular end piece 66 and the first housing 26 could have the corresponding cavity 78. In such an arrangement, the first housing 26 would carry the second retainer 64 and include the retainer opening. Further, the second housing 28 can be integrally formed in a housing of the light module 27, that is, the second housing 28 need not be a body that is separate from a housing that carries the one or more lights 29 of the light module 27. One or more bearings or reduced friction sliding surfaces can be provided between the first housing 26 and the second housing 28, as well as between the first housing 26 and the base 24 and connector 38, as desired. Further, the first retainer 42 and associated voids 58 of the first set are noted as moving axially (relative to the first axis 60) but the first retainer 42 and first voids 58 could be arranged radially if desired. Still other modifications and variations will be apparent to people of ordinary skill in the art in view of this disclosure.

What is claimed is:

1. A light assembly for a vehicle, comprising:
   a first housing having a first surface and multiple voids formed in the first surface, the multiple voids are circumferentially spaced apart about an axis of rotation of the first housing;
   a second housing coupled to the first housing;
   a light module coupled to the second housing;
   a first retainer mounted adjacent to the first housing and movable relative to the first housing between a first position in which the first retainer is at least partly received in at least one of the multiple voids and a second position in which the first retainer is not received in any of the multiple voids, wherein the first retainer in the first position inhibits or prevents rotation of the first housing relative to the first retainer, and the first retainer in the second position permits rotation of the first housing relative to the first retainer.

2. The assembly of claim 1 wherein the multiple voids are circumferentially spaced apart and a different one or more of the voids are aligned with the first retainer when the first housing is in a first position compared to a second position of the first housing, and wherein the first housing is rotated relative to the first retainer from the first position of the first housing to the second position of the first housing.

3. The assembly of claim 2 wherein the voids each have a central axis that is parallel to the axis of rotation, and wherein the first retainer moves in a direction that is parallel to the axis of rotation.

4. The assembly of claim 3 wherein the voids are radially spaced from the central axis.

5. The assembly of claim 1 wherein the voids each have a central axis that is parallel to the axis of rotation, and wherein the first retainer moves in a direction that is parallel to the axis of rotation.

6. The assembly of claim 1 wherein the first housing includes a connector opening adapted to receive a connector that secures the first housing to a vehicle, the connector opening is coaxial with the axis of rotation of the first housing, and wherein the first housing is arranged so that the first housing can rotate when the first retainer is in the second position and without moving the connector from the first housing.

7. The assembly of claim 1 wherein one of the first housing and the second housing includes an end piece and the other of the first housing and the second housing includes a cavity in which at least part of the end piece is received, and wherein the second housing is rotatable about a second axis relative to the first housing, and the second axis is not coaxial with the axis of rotation of the first housing.

8. The assembly of claim 1 which also includes a second retainer that is movable relative to the first housing, and wherein the second retainer has a first position in which rotation of the second housing relative to the first housing is prevented and the second retainer has a second position in which rotation of the second housing relative to the first housing is permitted.

9. The assembly of claim 8 wherein one or both of the first housing and the second housing has multiple second voids that are spaced apart about a second axis of rotation that is not parallel to the axis of rotation of the first housing, and when the second retainer is in the first position at least part of the second retainer is received in a second void and rotation of the second housing relative to the first housing about the second axis of rotation is prevented, and when the second retainer is in the second position the second retainer is not received in one of the second voids and rotation of the second housing relative to the first housing about the second axis of rotation is permitted.

10. The assembly of claim 9 wherein the second voids extend radially relative to the second axis, are circumferentially spaced apart and are axially aligned.

11. The assembly of claim 1 which also includes a biasing member that provides a force on the first retainer to yieldably bias the first retainer to the first position, and wherein the first retainer is moved to the second position against the force of the biasing member.

12. The assembly of claim 6 wherein the connector has a head that overlaps part of the first housing outside of the connector opening, and the connector has a shank that extends axially from the head and includes threads adapted to be received in a threaded opening of a base that is secured to or part of the vehicle.

13. The assembly of claim 6 wherein the first housing includes a wire opening that is open to the connector opening, and wherein the connector includes an opening that extends through the connector so that a wire of the light module can extend through the wire opening and through the connector.

14. The assembly of claim 1 wherein a housing for the light module is integral with the second housing.

15. A light assembly for a vehicle, comprising:
a first housing having a first set of retention features, the first set of retention features being circumferentially spaced apart about an axis of rotation of the first housing;
a second housing coupled to the first housing, at least one of the first housing and the second housing having a second set of retention features, the second set of retention features being circumferentially spaced apart about an axis of rotation of the second housing;
a light module integral with or coupled to the second housing;
a first retainer movable relative to the first housing between a first position in which the first retainer is associated with at least one retention feature of the first set of retention features and a second position in which the first retainer is spaced from retention features of the first set of retention features, wherein the first retainer when in the first position inhibits or prevents rotation of the first housing about the axis of rotation of the first housing, and the first retainer when in the second position permits rotation of the first housing about the axis of rotation of the first housing; and
a second retainer movable relative to the first housing between a first position in which the second retainer is associated with at least one retention feature of the second set of retention features and a second position in which the second retainer is spaced from retention features of the second set of retention features, wherein the second retainer when in the first position inhibits or prevents rotation of the second housing relative to the first housing and about the axis of rotation of the second housing, and the second retainer when in the second position permits rotation of the second housing about the axis of rotation of the second housing and relative to the first housing.

16. The assembly of claim 15 wherein the axis of rotation of the first housing is not parallel to the axis of rotation of the second housing.

17. The assembly of claim 15 wherein the first set of retention features includes multiple voids that each have a central axis that is parallel to the axis of rotation of the first housing.

18. The assembly of claim 15 wherein the second set of retention features includes multiple voids that each have a central axis that is radially oriented relative to the axis of rotation of the second housing.

19. The assembly of claim 15 wherein the first housing includes a connector opening adapted to receive a connector that secures the first housing to a vehicle, the connector opening is coaxial with the axis of rotation of the first housing, and wherein the first housing is arranged so that the first housing can rotate when the first retainer is in the second position and without moving the connector in the connector opening relative to the first housing.

20. The assembly of claim 19 wherein the first housing includes a wire opening that is open to the connector opening, and wherein the connector includes an opening that extends through the connector so that a wire of the light module can extend through the wire opening and through the connector.

* * * * *